(12) United States Patent
Teshima et al.

(10) Patent No.: US 12,172,502 B2
(45) Date of Patent: Dec. 24, 2024

(54) COMPOSITE VEHICLE COMPONENTS FORMED OF SHEET MOLDING COMPOUND REINFORCED WITH CONTINUOUS FIBERS

(71) Applicants: Teijin Limited, Osaka (JP); Continental Structural Plastics, Inc., Auburn Hills, MI (US)

(72) Inventors: Masatomo Teshima, Osaka (JP); Yoshiharu Asada, Osaka (JP); Yoshiki Kashiwagi, Osaka (JP); Marc-Philippe Toitgans, Pouance (FR)

(73) Assignees: Teijin Limited, Osaka (JP); Teijin Automotive Technologies, Inc., Auburn Hills, MI (US)

( * ) Notice: Subject to any disclaimer, the term of this patent is extended or adjusted under 35 U.S.C. 154(b) by 575 days.

(21) Appl. No.: 17/436,813

(22) PCT Filed: Mar. 11, 2020

(86) PCT No.: PCT/US2020/021970
§ 371 (c)(1),
(2) Date: Sep. 7, 2021

(87) PCT Pub. No.: WO2020/185821
PCT Pub. Date: Sep. 17, 2020

(65) Prior Publication Data
US 2022/0169097 A1 Jun. 2, 2022

Related U.S. Application Data

(60) Provisional application No. 62/816,634, filed on Mar. 11, 2019.

(51) Int. Cl.
*B60J 5/04* (2006.01)

(52) U.S. Cl.
CPC .................................. *B60J 5/0444* (2013.01)

(58) Field of Classification Search
CPC ........ B60J 5/042; B60J 5/0422; B60J 5/0423; B60J 5/0425; B60J 5/0444; B60J 5/0445; B60J 5/0447; B60J 5/0443
See application file for complete search history.

(56) References Cited

U.S. PATENT DOCUMENTS

2004/0217623 A1   11/2004   Chernoff et al.
2009/0165392 A1   7/2009   Totani et al.
(Continued)

FOREIGN PATENT DOCUMENTS

KR   1020170091384 A   8/2017
WO   2018049319 A1   3/2018

OTHER PUBLICATIONS

Int'l Search Report for PCT/US2020/021970, dated Jun. 30, 2020.
Supplementary EP Search Report issued in EP Appln. No. 20770409, dated Oct. 21, 2022.

*Primary Examiner* — Catherine A. Simone
(74) *Attorney, Agent, or Firm* — MaxGoLaw PLLC

(57) ABSTRACT

A vehicle component includes a body, a first beam, and a second beam. The body has a first fixture region and a second fixture region. The first beam is formed of a first composite material and has a first beam shape. The first beam is attached to the body and extends between the first fixture region and the second fixture region of the body. The second beam is formed of a second composite material and has a second beam shape that is simple compared to the first beam shape. The second beam is attached to the body and extends between the first fixture region and the second fixture region of the body.

19 Claims, 4 Drawing Sheets

(56) References Cited

U.S. PATENT DOCUMENTS

2016/0137038 A1 5/2016 Schijve et al.
2017/0166038 A1 6/2017 Jang et al.

COMPOSITE VEHICLE COMPONENTS FORMED OF SHEET MOLDING COMPOUND REINFORCED WITH CONTINUOUS FIBERS

CROSS-REFERENCE TO RELATED APPLICATION

This application claims priority of U.S. Provisional Patent Application Ser. No. 62/816,634 filed Mar. 11, 2019, which is incorporated herein by reference.

FIELD OF THE INVENTION

The present invention in general relates to vehicle body components and in particular to vehicle body components with sections formed of different fiber reinforced composites.

BACKGROUND OF THE INVENTION

Weight savings in the automotive, transportation, aerospace, and logistics based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for reasons that include materials which are stronger, lighter, or less expensive when compared to traditional materials. Still another advantage over metals is reduced corrosion, leading to longer operational life and reduced maintenance costs.

There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers.

Structural automotive components are designed to protect vehicle occupants during collisions by absorbing and dissipating kinetic energy. For example, as shown in FIG. 1, front passenger vehicle doors 12 and back passenger vehicle doors 14 commonly include side impact bars 16, 18, also known as an anti-intrusion bars or beams, which are designed to protect passengers from side impacts. Side impacts are particularly dangerous since the location of impact is very close to the passenger, who can be immediately reached by the impacting vehicle or object. The role of the side impact bar is to absorb the kinetic energy of the colliding vehicles or objects that is partially converted into internal work of the members involved in the crash. Structural automotive components are also designed to minimize damage to the vehicle in low speed collisions by absorbing the kinetic energy by temporally deforming or deflecting.

Over time, geometries, overall configurations, and materials of structural vehicle components have changed in an to attempt to reduce vehicle weight. For example, FIG. 2 shows a structural vehicle component 20 having an upper beam 22 and a lower beam 24 made of composite materials. While this proved a successful use of composites, this design mimics the use of metal components and does not fully leverage the benefits available from composite components.

Thus, there exists a need for a vehicle structural component design that utilizes composite materials to lower the weight of the component, while improving the safety performance and manufacturability compared to conventional vehicle components.

SUMMARY OF THE INVENTION

The present invention provides a vehicle component that includes a body, a first beam, and a second beam. The body has a first fixture region and a second fixture region. The first beam is formed of a first composite material and has a first beam shape. The first composite material is for example thermoset resin, which may or may not be reinforced with chopped fibers such as carbon fibers, glass fibers, aramid fiber, natural fibers, cellulosic fibers, or a combination thereof. The first beam is attached to the body and extends between the first fixture region and the second fixture region of the body. The second beam is formed of a second composite material and has a second beam shape that is simple compared to the first beam shape. The second composite material is for example a unidirectional fiber reinforced composite, in which the fibers may be carbon fibers, glass fibers, aramid fiber, natural fibers, cellulosic fibers, of a combination thereof. The second beam is attached to the body and extends between the first fixture region and the second fixture region of the body. The first beam is spaced apart from said second beam on the body. The outer surface of the first beam extends outward from a center line relative to the outer surface of the second beam. The first beam has a first surface area and the second beam has a second surface area, a ratio of the first surface area to the second surface area being between 2-10:1.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

Figure 1:
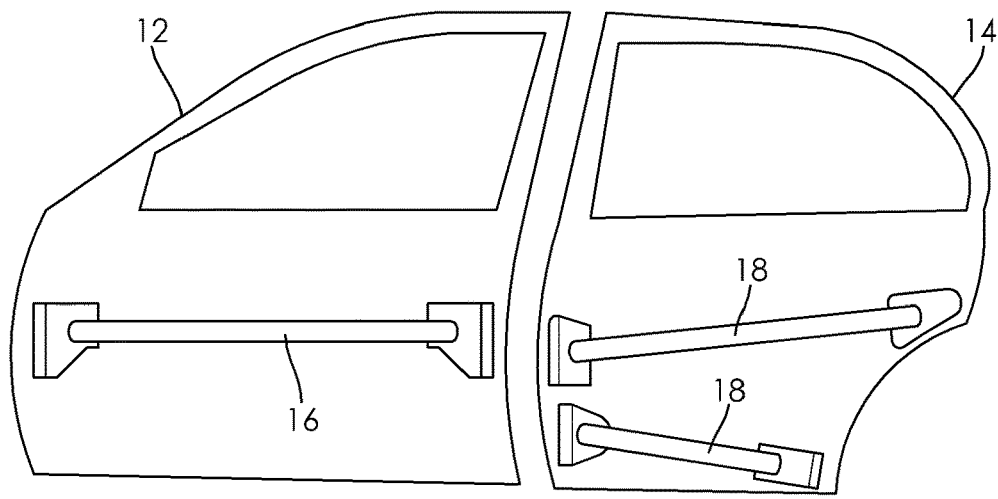
FIG. 1 shows a prior art passenger vehicle door assembly showing side impact bars.

The present invention has utility as a lightweight vehicle structural component providing improved automotive crash resistance by strengthening vehicle body components while reducing weight. Accordingly, vehicle structural components according to embodiments of the present disclosure have improved safety performance and manufacturability and reduced weight compared to existing vehicle structural components. While the present invention is discussed in the context of vehicle door due the rigorous safety standards associated with a door, it is appreciated that the present invention is suited for the production of a variety of vehicle components that also illustratively include hoods, decklids, roofs, tailgates, and liftgates.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

As used herein, the term "side impact pole test" refers to NCAP Side Impact Rigid Pole Test as defined by US Department of Transportation Rev. Sep. 19, 2012.

As used herein, the term "continuous fiber" refers to fibers that extend from edge to edge of a vehicle component, or fibers that are placed in a pattern within the vehicle component without having been cut.

Figure 3A:
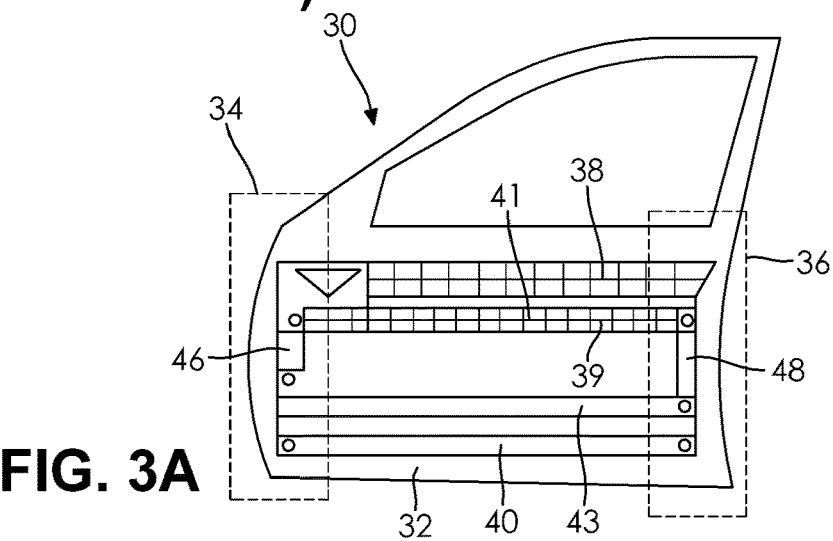
FIG. 3A shows a side view of a vehicle body component construct according to embodiments of the present invention.
Figure 3B:
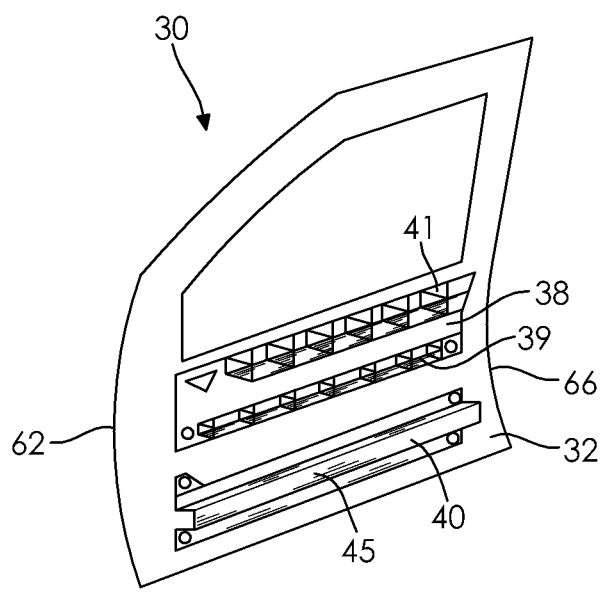
FIG. 3B shows a perspective view of the vehicle body component construct of FIG. 3A.
Figure 3C:
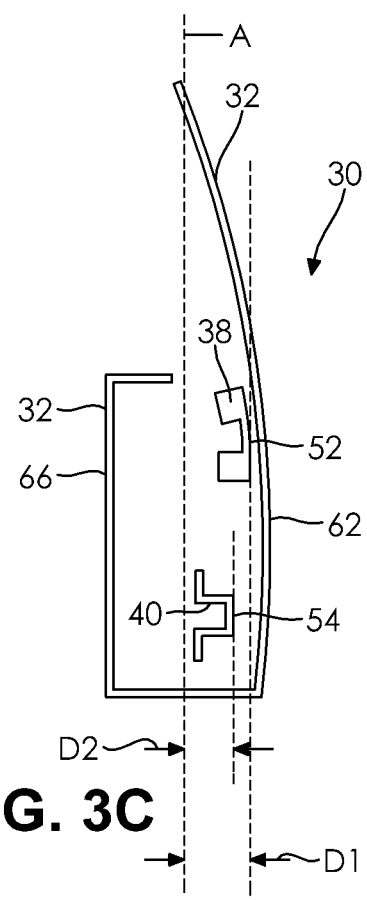
FIG. 3C shows a cross-sectional view of the vehicle body component construct of FIGS. 3A and 3B.

As shown in FIGS. 3A-3C, embodiments of a vehicle component 30 of the present invention include a body 32 having a first fixture region 34 and a second fixture region 36, a first beam 38, and a second beam 40. The body 32 and beams 38, 40 each have a predetermined geometry based on a given application and intended location within a vehicle so as to be complementary to other components of the vehicle. It is appreciated that the first fixture region 34 and a second fixture region 36 are formed integral from the same material as the body 32, or alternatively are each independently inserts to the body having a different composition from the remainder of the body 32.

Figure 3D:
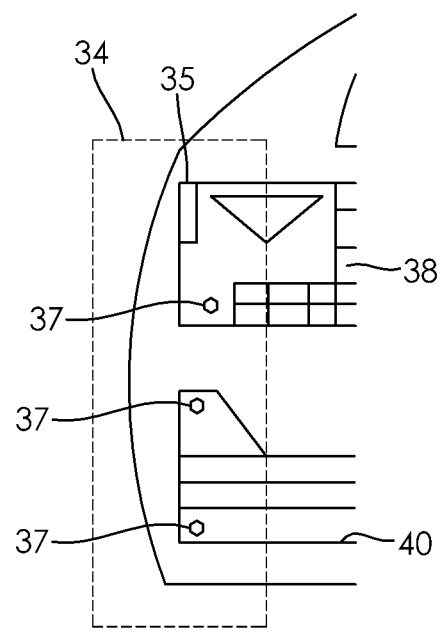
FIG. 3D is a magnified view of the leftmost dashed box in FIG. 3A with the beam shown in ghost to illustrate the joining of the beam to a second fixture region.
Figure 3E:
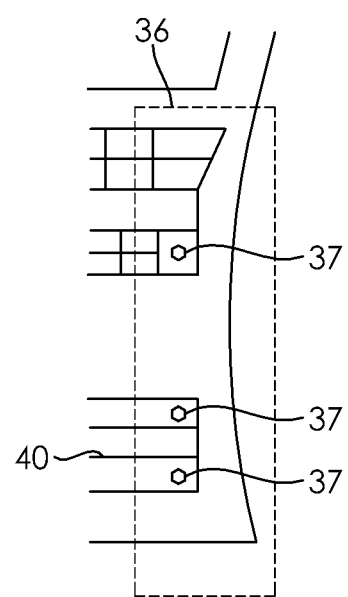
FIG. 3E is a magnified view of the rightmost dashed box in FIG. 3A with the beam shown in ghost to illustrate the joining of the beam to a first fixture region.

The body 32 is limited in construction and materials only by compatibility with the beams 38 and 40, and is illustratively formed of steel, aluminum, magnesium alloys, titanium, titanium alloys, fiberglass set up sheets embedded in thermoset resin, SMC, BMC, or a combination thereof. In certain inventive embodiments, the body 32, the first fixture region 34, and the second fixture region 36 are formed of SMC and other materials. The body 32 has an inner side 66 and an outer side relative to vehicle passenger compartment. In still other embodiments, the first fixture region 34, and the second fixture region 36 are integral with the body 32. It is noted that joints are conventionally formed based on the nature of the material with adhesives, mechanical fasteners, or a combination thereof generically, while welding and brazing are most often used to form a body 32 from metals. An exemplary joining of the first beam 38 between the second fixture region 34 and the first fixture region 36 is shown in FIGS. 3D and 3E, respectively using a combination of mechanical fasteners 37 and adhesive 35. An exemplary joining of the second beam 40 between the second fixture region 34 and the first fixture region 36 is also shown in FIGS. 3D and 3E, respectively using a combination of mechanical fasteners and adhesive. It is further appreciated that the body 32 includes hardened points for mounting hinges 42, in FIG. 6 on a front stile and a rear stile lock (not shown for visual clarity) to selectively allow the component 30 to secure to the remainder to the vehicle. While it is conventional that a component 30 that forms a vehicle door has two front hinges and a lock-vehicle chassis post engagement to form a three point closure, it should be appreciated that this is only exemplary and other types of components 30 and indeed, other types of doors have different hardware for selectively moving the component relative to the vehicle.

The first beam 38 is attached to the body 32, generally at the first fixture region 34 and second fixture region 36, such that the first beam 38 spans between the first fixture region 34 and second fixture region 36 of the body 32. The first beam 38 is formed from chopped fiber reinforced resin and is characterized by a complex shape positioned such that to the extent there is concavity, the opening is directed away from the expected direction of impact. The first beam 38 is formed from a variety of resins. These illustratively include SMC, epoxy, acrylonitrile butadiene styrene (ABS), polycarbonate, or random-oriented fiber reinforced thermoplastic resin (FRTP). When an inventive component 30 is a door, the expected direction of impact is from the door exterior. Fiber fillers operative herein illustratively include carbon fibers, glass fibers, aramid fibers, cellulosic fibers, or a combination thereof. In some inventive embodiments, the chopped fiber is glass fiber, alone or in combination with other types of fiber. It is appreciated that in some inventive embodiments, a minority by fiber weight in the first beam 38 is continuous fiber. Exemplary continuous fibers are detailed below with respect to the second beam 40. A typical thickness of the first beam 38 at a given point ranges from 0.5 to 6 mm when the first beam is carbon fiber-SMC(CF-SMC). In still other embodiments, the thickness of the first beam 38 is from 1.5 to 5 mm when the first beam is CF-SMC.

In some inventive embodiments, the first beam is reinforced with a rib 39 of a same material as the first composite material to impart additional strength or penetration resistance to the first beam 38. The rib 39, if present, can be adhered to the exterior of the first beam 38 or the first beam 38 molded so as encase the rib 39. It is appreciated that the first beam 38 is readily formed from uniform thickness resin molding or can vary in thickness across the extent thereof. According to some inventive embodiments, the first beam 38 has surface treatments 41 illustratively includes grooves, ridges, dimples, or a combination thereof that are known to contribute additional strength thereto.

The second beam 40 is attached to the body 32, generally at the first fixture region 34 and second fixture region 36, such that second beam 40 spans between the first fixture region 34 and second fixture region 36 of the body 32. The second beam 40 is formed of a second composite material that is different from the first composite material of the first beam 38. In particular, the second beam 40 is formed of a continuous fiber reinforced composite, with the majority of fiber direction chosen to be orthogonal to an expected direction of impact. It is appreciated that lesser amounts of the total fiber content in the second beam 40 can have a different orientation relative the majority of the continuous fiber direction. In other inventive embodiments continuous fiber extend in multiple directions such that no single direction includes a majority by weight of the fiber; for example, as several vehicle components other than doors. The continuous fiber reinforced composite includes metal wires, carbon fibers, glass fibers, aramid fibers, or a combination thereof impregnated with a resin to define the shape of the second beam 40. In some inventive embodiments, the continuous fiber is only carbon fiber as owing to the attractive strength and weight attributes of carbon fiber. An exemplary source of carbon fiber operative herein is Tenax® (Teijin Ltd., Tokyo). In some inventive embodiments, a lesser amount by weight of any of the aforementioned chopped fiber is also present in the second beam 40 relative to the amount by weight of continuous fiber. A typical thickness of the second beam 40 at a given point ranges from 5-13 mm. In still other inventive embodiments, the thickness of the second beam rages from 7 to 11 mm. The second beam 40 is formed from a variety of resins. These illustratively include thermoset resins such as SMC, epoxy, vinyl ester, phenol, thermosetting polyimide, polyurethane, urea, melamine and bismaleimide; and thermoplastics such as polyamide, polyalkylenes, ABS, polycarbontes, FRTP, poly(m-ethyl methacrylate) (PMMA). In addition to a single epoxy resin, a copolymer of an epoxy resin and a thermosetting resin, a modified product, a resin obtained by blending two or more kinds of resins, and so on can be used. In some inventive embodiments, the second beam 40 is formed with a "top hat" characterized by edges parallel to a central section with orthogonal sides intermediate between the edges and the central section. In still other embodiments, the second beam 40 is formed with a rectilinear box cross section. It is appreciated that the second beam 40 is formed with still other cross-sectional shapes, as measured in the middle of the beam 40; these other cross-sectional shapes including triangular, pentagonal, and hexagonal. According to some inventive embodiments, the second beam 40 has surface treatments 43 illustratively includes grooves, ridges, dimples, or a combination thereof that are known to contribute additional strength thereto. In some inventive embodiments, the second beam 40 is reinforced with a rib 45 of a same material as the second composite material to impart additional strength or penetration resistant to the first beam 38. The rib 45, if present, can be adhered to the exterior of the second beam 40 or the second beam 40 molded so as encase the rib 45.

Figure 2:
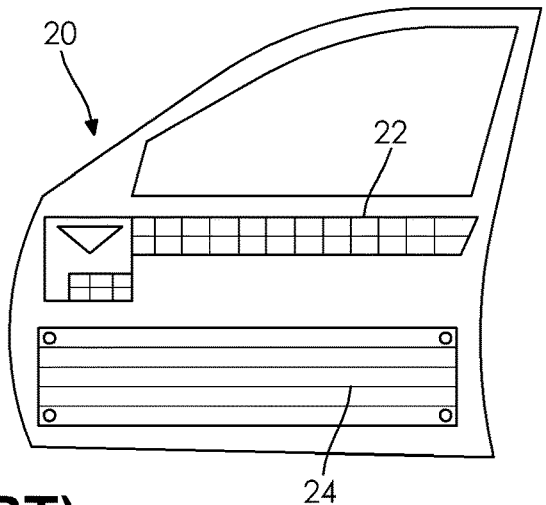
FIG. 2 shows a prior art passenger vehicle door component showing side impact beams formed of composite materials.

The relationship between the first beam 38 and the second beam 40 is critical to providing a lightweight component that retains a high degree of crush resistance. The first beam 38 is generally designed to include a complex shape relative to the second beam 40. In some inventive embodiments, the first beam 38 is designed to have a greater tensile stiffness per unit area than the second beam 40 orthogonal to the first beam and the second beam, while the second beam 40 is designed to have a greater strength per unit area than the first beam 38 orthogonal to the first beam and the second beam; while in other inventive embodiments one or both of these attributes are not present. With respect to the body being a door as shown in the drawings, the first beam 38 has a complicated shape that is readily molded with SMC that can form a mount for a window frame, a door mirror, or a combination thereof. In some inventive embodiments, the surface area of the first beam 38 has a ratio to the surface area of the second beam 40 of between 2-10:1. This feature is best shown by way of comparison between the inventive vehicle component 30 of FIG. 3A and an existing vehicle component 20 of FIG. 2.

While the first beam 38 is shown mounted above and spaced apart from the second beam 40 in the drawings, it is appreciated that the relative position of the beams 38 and 40 is varied depending on the nature of the vehicle component. In still other embodiments, additional beams formed of the materials of the first beam 38 or the second beam 40 are present to impart desired properties to a given vehicle component 30. By way of example, another beam of the composition of the first beam 38 could be attached along a lower edge of a vehicle component, another beam of the composition of the second beam 40 could be attached proximal to the second beam 40 to impart additional stiffness, or both types of beams are replicated in a given vehicle component. It is also appreciated that while the first beam 38 and second beam 40 are shown generally parallel to one another to provide excellent response to a side pole crash test, beams according to the present invention are readily deployed at a variety of relative angles.

To further facilitate protection relative to an exterior impact, the first beam 30 in some embodiments is displaced outward on the vehicle component 30 relative to the second beam 40. As best shown in FIG. 3C, an outer surface 52 of the first beam 38 is outwardly displaced relative to an outer surface 54 of the second beam 40. More specifically, the outer surface 52 of the first beam 38 is positioned a first distance D1 from a central axis A of the body 32, and the outer surface 54 of the second beam 40 is positioned a second distance D2 from the center line A of the body 32, wherein the first distance D1 is greater than the second distance D2. Accordingly, in an impact event, the first beam 38 contacts an impacting object before the second beam 40. Without intending to be bound to a particular theory, the first beam 38, for example, formed of chopped fiber reinforced SMC having a high impact energy absorption capability, absorbs and dissipates the kinetic energy of the impact, preventing penetration into the vehicle passenger compartment, while the second beam 40, generally formed of a unidirectional fiber reinforced composite having a high stiffness, provides necessary rigidity to hold the various components of the vehicle component 30 intact and transmit impact forces to the body 32 of the vehicle component.

Figure 6:
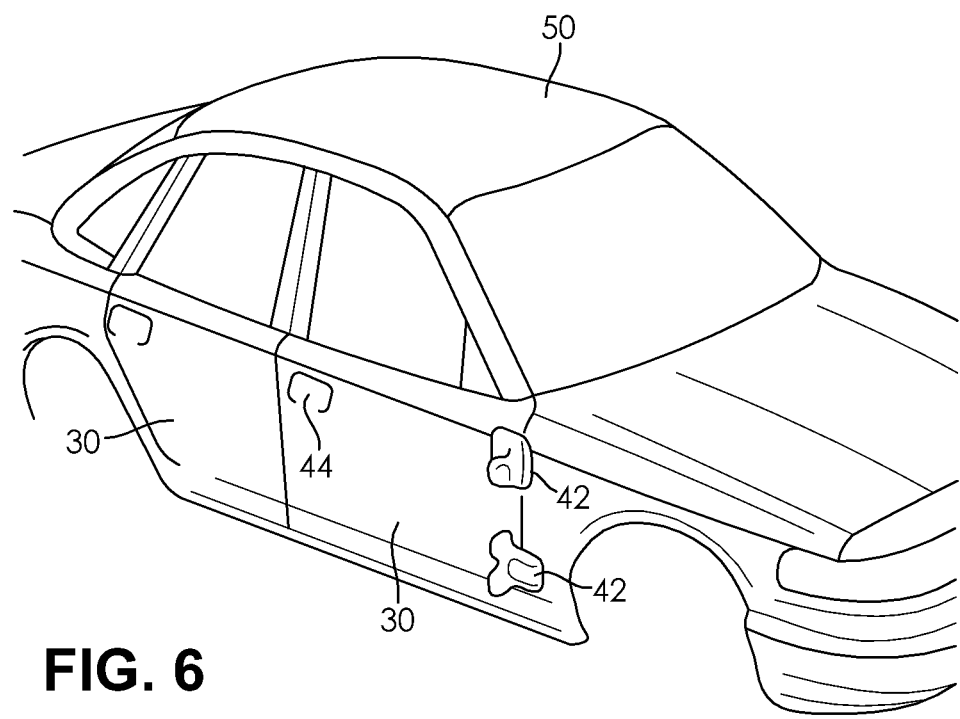
FIG. 6 shows a perspective view of a vehicle body component assembly attached to a vehicle frame according to embodiments of the present disclosure.

As best shown in FIG. 6, according to certain inventive embodiments, the first fixture region 34 defining a front stile of the door is configured to receive at least one hinge 42 to secure the vehicle component 30 to a frame of a vehicle 50, while the second fixture region 36 defining the rear stile of the door is configured to receive a latch 44 to releasably secure the vehicle component 30 to the vehicle frame 50. According to some inventive embodiments and as best shown in FIGS. 3A and 3B, the vehicle component 30 includes one or both of a first reinforcing component 46 attached to the body 32 at the first fixture region 34 and a second reinforcing component 48 attached to the body 32 at the second fixture region 36.

Figure 4:
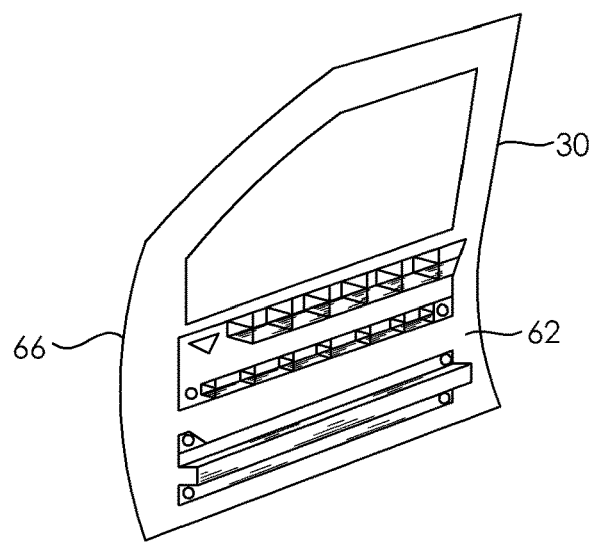
FIG. 4 shows an expanded perspective view of a vehicle body component assembly according to embodiments of the present disclosure.
Figure 5:
FIG. 5 shows an expanded perspective view of a vehicle body component assembly according to embodiments of the present disclosure.
Figure 5:
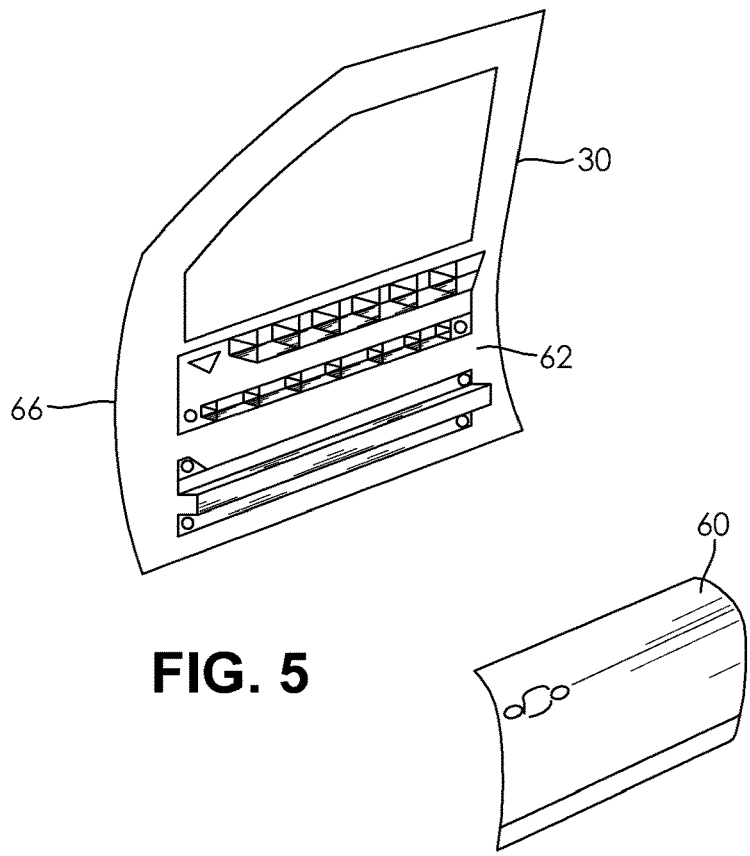

As shown in FIGS. 4 and 5, the vehicle component 30 may be an inner structure for reinforcing a vehicle door or other vehicle body component. According to embodiments, the vehicle component 30 is connected to an outer skin 60 on an outer side 62 of the body 32. In further embodiments, the vehicle component 30 is placed between an outer skin 60 on an outer side 62 of the body 32 and an inner skin 64 on an inner side 66 of the body 32. According to embodiments, the outer skin 60 is an outer body panel formed of at least one of steel, aluminum, and a composite material. The inner skin 64 is an aesthetic panel facing the vehicle interior. According to embodiments, the vehicle component 30 further comprising at least one of sound deadening material, vehicle electronics, an aramid panel, and HVAC components positioned in a cavity defined between the body 32 and at least one of the outer skin 60 and the inner skin 64.

The present invention is further detailed with respect to the following non-limiting example.

EXAMPLE

A vehicle door is constructed and skinned according to FIGS. 3A-5 with a chopped carbon fiber filled first beam and a glass fiber based unidirectional fiber second beam. The resulting door represents a 10% weight savings relative to a similar door per FIG. 2. The inventive door passes the side impact pole test with minimal inward intrusion.

The foregoing description is illustrative of particular embodiments of the invention but is not meant to be a limitation upon the practice thereof. The following claims, including all equivalents thereof, are intended to define the scope of the invention.

The invention claimed is:

1. A vehicle component comprising:
 a body having a first fixture region and a second fixture region;
 a first beam attached to said body and extending between the first fixture region and the second fixture region with a first beam shape, said first beam being formed of a first composite material;
 a second beam attached to said body and extending between the first fixture region and the second fixture region, said second beam being formed of a second composite material and having a second beam shape that is simple compared to the first beam shape; and
 said first beam having a first surface area and said second beam having a second surface area, a ratio of the first surface area to the second surface area being between 2-10:1.

2. The vehicle component of claim 1 wherein the first composite material of said first beam is thermoset resin.

3. The vehicle component of claim 2 wherein the thermoset resin is SMC reinforced with chopped fibers.

4. The vehicle component of claim 3 wherein the chopped fibers are carbon fibers, glass fibers, aramid fiber, natural fibers, cellulosic fibers, or a combination thereof.

5. The vehicle component of claim 1 wherein the second composite material of said second beam is a unidirectional fiber reinforced composite.

6. The vehicle component of claim 5 wherein the unidirectional fiber reinforced composite comprises any of carbon fibers, glass fibers, aramid fiber, natural fibers, cellulosic fibers, or a combination thereof.

7. The vehicle component of claim 1 wherein said first beam is spaced apart from said second beam.

8. The vehicle component of claim 1 wherein an outer surface of said first beam extends outward from a center line relative to an outer surface of said second beam.

9. The vehicle component of claim 1 wherein the second beam has a cross-section that is a top hat or a box.

10. The vehicle component of claim 1 wherein at least one of the first beam or the second beam further comprises a surface treatment of grooves, ridges, dimples, or a combination thereof.

11. The vehicle component of claim 1 wherein at least one of the first beam or the second beam further comprises a rib.

12. The vehicle component of claim 1 wherein the first beam is substantially parallel to the second beam.

13. The vehicle component of claim 1 wherein the first fixture region is configured to receive a hinge.

14. The vehicle component of claim 1 wherein the second fixture region is configured to receive a latch.

15. The vehicle component of claim 1 further comprising a reinforcing component.

16. The vehicle component of claim 1 further comprising an outer skin attached to a first side of said body.

17. The vehicle component of claim 1 further comprising an inner skin attached to a second side of said body.

18. The vehicle component of claim 17 further comprising at least one of sound deadening material, vehicle electronics, an aramid panel, and HVAC components positioned in a cavity defined between said body and inner skin.

19. The vehicle component of claim 1 wherein the first beam has a greater tensile strength per unit area than the second beam measured orthogonal to the first beam and the second beam, and the second beam having a greater stiffness per unit area than the first beam measured orthogonal to the first beam and the second beam.

\* \* \* \* \*